United States Patent [19]
Neese

[11] 4,433,750
[45] Feb. 28, 1984

[54] SYNTHETIC HORN PROJECTOR WITH METAL INSERT

[75] Inventor: James A. Neese, Flora, Ill.

[73] Assignee: Sparton Corporation, Jackson, Mich.

[21] Appl. No.: 339,319

[22] Filed: Jan. 15, 1982

Related U.S. Application Data

[63] Continuation-in-part of Ser. No. 236,662, Feb. 23, 1981, Pat. No. 4,361,952.

[51] Int. Cl.³ ........................ B60Q 5/00; G10K 11/00
[52] U.S. Cl. .................................... 181/179; 181/159; 181/161; 181/180; 116/59; 116/142 R
[58] Field of Search ............... 181/159, 161, 179, 171, 181/199, 158, 180; 179/101; 116/59, 137 R, 142 R

[56] References Cited

U.S. PATENT DOCUMENTS

| | | | |
|---|---|---|---|
| 3,140,754 | 7/1964 | Motsinger | 181/158 |
| 3,516,088 | 6/1970 | Allport | 340/388 |
| 4,135,473 | 1/1979 | Frigo | 116/142 R |

*Primary Examiner*—Benjamin R. Fuller
*Attorney, Agent, or Firm*—Beaman & Beaman

[57] ABSTRACT

The invention pertains to electric horns for automobiles wherein a metal horn motor housing is assembled to a sound projector formed of synthetic plastic. A metal insert is molded into the projector having a metal flange extending from the projector adjacent a projector mounting surface whereby the insert flange is deformed upon the motor housing to produce an effective mechanical interconnection and assembly of the motor housing and projector.

6 Claims, 7 Drawing Figures

SYNTHETIC HORN PROJECTOR WITH METAL INSERT

This application is a continuation-in-part of Ser. No. 236,662, filed Feb. 23, 1981, now U.S. Pat. No. 4,361,952.

BACKGROUND OF THE INVENTION

Electric horns for automobiles producing an audible warning signal commonly consist of a flexible diaphragm supported at its periphery mechanically interconnected to an electric vibratory motor and in communication with a projector for projecting the sound vibrations created by the diaphragm. The motor usually consists of an armature capable of vibrating in the direction of its axis under the influence of a "make and break" circuit, and the projector is assembled to the motor housing having an inlet substantially concentrically related to the diaphragm, and an enlarged outlet through which the sound vibrations are projected. Commonly, the motor housing subassembly is formed of metal, the housing usually being of sheet steel, and as the projector is often in the form of a spiral scroll of relatively complex configuration the projector may be of a synthetic plastic material. The diaphragm is normally mounted intermediate mounting surfaces defined upon the motor housing and projector, and a variety of fastener devices have been used to interconnect the projector to the motor housing. For instance, bolts or rivets extending through the projector and motor housing have been employed, clips or mechanical fasteners can be used to interconnect these components, it may be possible to deform a portion of the projector upon the motor housing if the projector is formed of metal, or the motor housing may include a deformable portion which can be formed over portions of the projector to produce an interconnection.

Ideally, the assembly of the projector and motor housing should be of such a nature that the interconnection is weatherproof, attractive, free of projections or extensions, concise, capable of producing a uniform assembly force throughout the periphery of the diaphragm in order to achieve consistent audio characteristics over an extended life cycle and readily achieved by high production fabrication techniques. Difficulty has been encountered in achieving these objects in the assembly of a synthetic plastic projector and metal motor housing.

It is an object of the invention to interconnect a synthetic plastic horn projector to an electric motor housing wherein the assembly supports a diaphragm throughout its periphery, and wherein the assembly will maintain consistent audio characteristics throughout the life of the horn.

Another object of the invention is to provide an assembly between a metal horn motor housing and a synthetic plastic projector wherein the assembly is free of bolts, or rivets, and produces uniform forces throughout the interconnection, and wherein the interconnecting structure is concise in configuration, and capable of producing a substantially weathertight seal.

A further object of the invention is to provide an interconnection between an electric horn motor housing and a synthetic plastic sound projector wherein a metal insert is molded into the projector and includes a continuous flange which is mechanically deformed throughout its configuration upon a flange defined upon the motor housing.

Another object of the invention is to provide a synthetic plastic horn projector utilizing a metal insert integrally molded into the projector wherein the insert includes means for facilitating the interconnection between the projector material and the insert, and the insert includes a deformable flange which may be rolled upon a horn motor housing for assembly of the projector thereto.

In the practice of the invention the electric horn includes a motor subassembly mounted within a sheet metal housing, and the housing encompasses an armature axially vibrating within an electric coil. The housing includes a substantially planar flange having a circular periphery defining a planar mounting surface to which the diaphragm and projector are secured.

The horn projector is formed of a synthetic plastic material by a molding operation, and comprises two parts which are cemented or otherwise bonded in assembled relationship.

The projector part disposed adjacent the motor housing includes a substantially flat mounting surface which is related in opposed relationship to the motor housing flange mounting surface, and the horn diaphragm is sandwiched between the mounting surfaces of the housing and projector upon suitable annular spacers. The projector includes an inlet opening centrally located with respect to the diaphragm, and a spiral or scroll air passage is defined in the projector terminating in an enlarged bell outlet.

A metal insert is molded into the projector portion disposed adjacent the diaphragm and motor housing. This insert includes a central portion having a plurality of holes defined therein for receiving the projector material during molding to insure a firm mechanical interconnection between the insert and projector. The insert also includes a peripheral region from which depends a cylindrical flange having an axis perpendicularly disposed to the plane of the insert central region. The diameter of the insert flange is slightly greater than the diameter of the motor housing flange periphery, and in assembly, the insert flange extends about the motor housing periphery, and the free end of the insert flange is rolled over upon the motor housing flange to produce a firm mechanical interconnection between the projector and motor housing.

As the insert flange is of a continuous configuration and is rolled over upon the motor housing flange throughout its configuration a uniform assembly pressure is maintained between the mounting surfaces of the motor housing and projector, which imposes a uniform assembly pressure throughout the periphery of the horn diaphragm throughout the life of the horn which will not weaken due to horn vibration, and as the insert flange closely confines the motor housing flange periphery this mechanical interconnection is concise and results in no projections or protuberances upon the horn.

As the metal insert embedded within the projector material extends throughout the width of the projector a very high strength integral assembly between the projector and insert is achieved, and as the metal of the insert flange is readily deformable over the motor housing flange consistent assembly is achievable under high production manufacturing techniques.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 2:
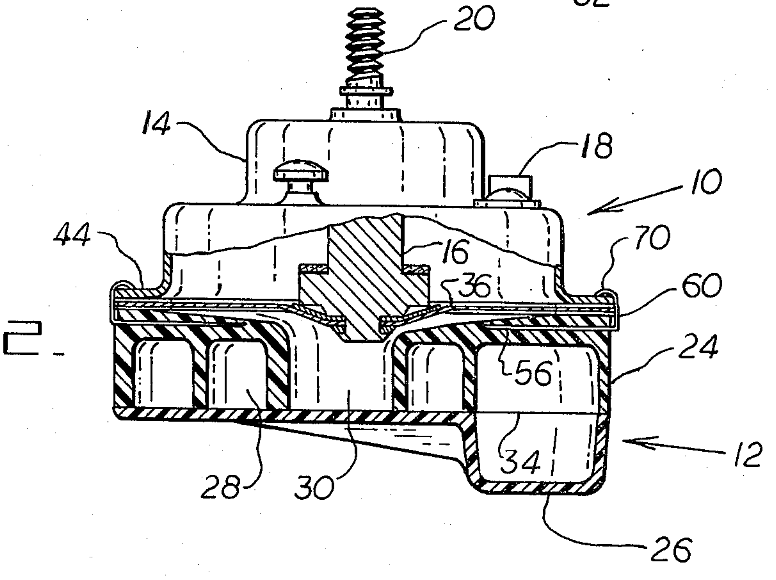
FIG. 2 is a side elevational view of the horn of the invention, partially in diametrical section.

The automobile electric horn in which the invention is practiced is of a basic conventional construction in that it utilizes a motor subassembly 10 assembled to a projector 12. The motor subassembly 10 includes a sheet metal housing 14 of a stepped cup configuration which houses the motor for vibrating the diaphragm which produces the sound vibrations. The motor housing includes a coil, not shown, in which an armature 16, FIG. 2, is located, and a circuit control switch, not shown, causes the armature to rapidly vibrate within the coil upon electricity being supplied to the coil through the terminal 18 mounted upon the housing 14. The horn may be mounted by means of a threaded stem 20 extending from the housing and the horn is normally mounted directly behind the automobile grill.

Figure 1:
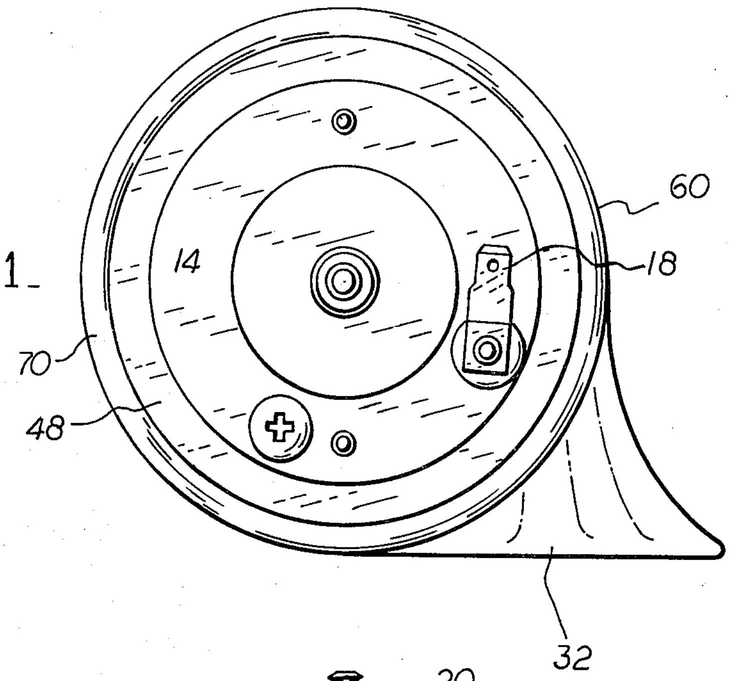
FIG. 1 is a top plan view of an electric automobile horn in accord with the invention.

The projector 12 consists of an inner part 24, and an outer part 26, both of which are of a molded construction and formed of a synthetic plastic material, such as a glass fiber reinforced polypropylene. The projector portion 24 includes a spiral or scroll air passage 28 having a central inlet opening 30 communicating with the diaphragm, and terminating in an enlarged bell 32, FIG. 1, through which the vibrations are projected to the atmosphere and the projector portions 24 and 26 are bonded together at the parting line 34, FIG. 2.

Sound is produced by the metallic diaphragm 36 located intermediate the motor housing subassembly 10 and the projector 12. As disclosed, the diaphragm 36 is of a circular configuration wherein its outer periphery 38 is supported between mounting surfaces defined upon the motor housing and projector, and the armature 16 is affixed to the center of the diaphragm wherein axial oscillation of the armature will vibrate the diaphragm. As will be appreciated from FIG. 3, annular mounting gaskets 40 and 42 are interposed on opposite sides of the diaphragm periphery to space the diaphragm from the adjacent motor housing or projector mounting surface, and assembly of the diaphragm between the associated mounting surfaces occurs during assembly of the motor housing and projector.

The sheet metal housing 14 includes a radially extending flange 44 having an outer circular periphery 46, an outer radial surface 48, and an inner radial mounting surface 50. The mounting surface 50 is of an annular planar configuration and lies within a common plane substantially perpendicular to the axis of the housing 14.

Figure 3:
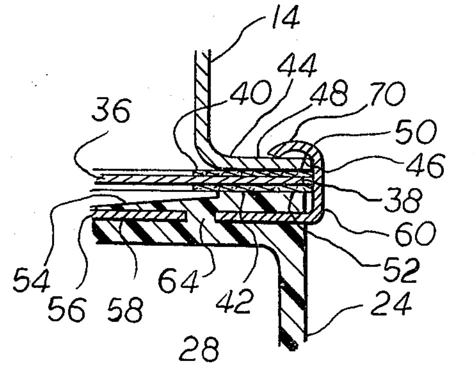
FIG. 3 is an elevational, enlarged, detail, sectional view of the motor housing flange, diaphragm, and projector flange in assembled relationship.
Figure 5:
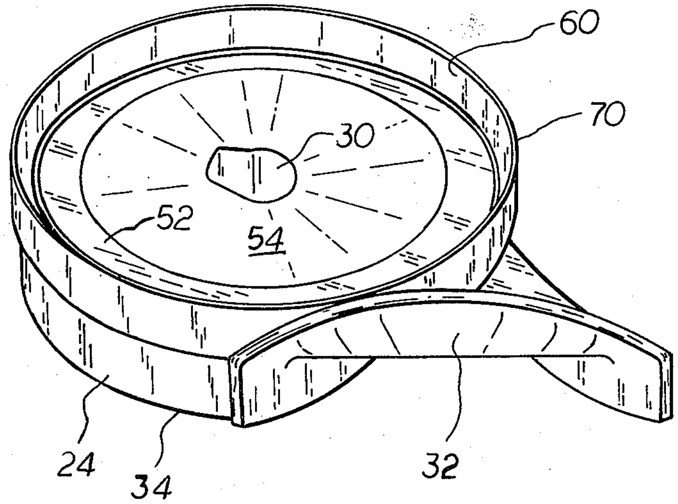
FIG. 5 is a perspective view of the horn projector portion in which the metal insert is molded illustrating the insert prior to being deformed upon the motor housing.

The projector inner portion 24 is of a generally circular configuration, except for the presence of the bell 32, FIG. 5, and includes an annular planar mounting surface 52, FIG. 3, which lies within a common plane substantially perpendicular to the axis of the portion 24. The projector portion 24 includes a conical surface 54 extending from the mounting surface 52 merging with the air passage inlet 30. The conical configuration of the surface 54 provides clearance between the projector portion 24 and the diaphragm 36 as not to interfere with the diaphragm movement, or the transmission of vibrations from the diaphragm into the air passage.

Figure 7:
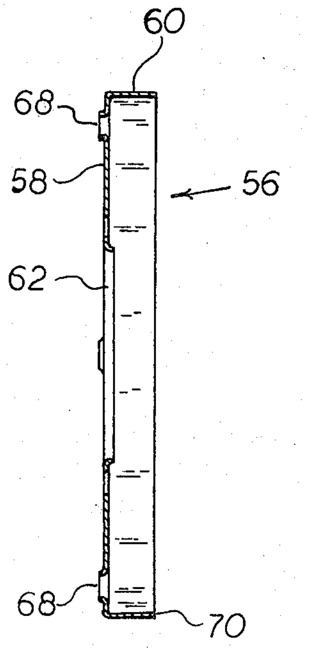
FIG. 7 is an elevational sectional view of the insert as taken along Section VII—VII of FIG. 6.
Figure 6:
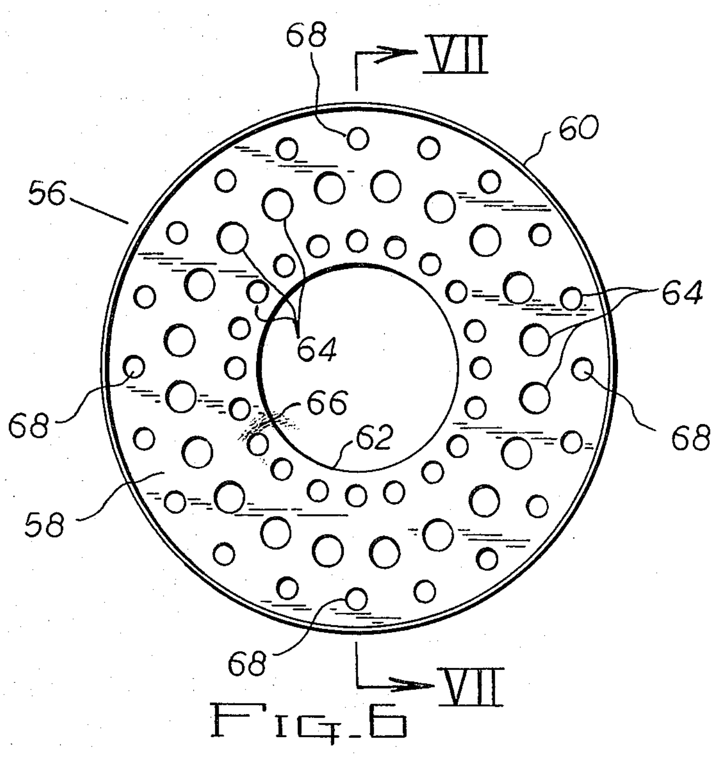
FIG. 6 is an elevational view of the metal insert used in conjunction with the concept of the invention.

The projector 12 is mounted to the motor housing 14 by means of a metal insert embedded into the material of the projector portion 24. The metal insert 56 is best illustrated in FIGS. 6 and 7, and includes a flat central portion 58 from which depends a cylindrical flange 60. The central portion 58 is provided with an enlarged central opening 62, and a plurality of holes 64 are defined in the central portion for a purpose later described. The region 66 immediately adjacent the central opening 62 is deformed from the plane of the central region in the direction of the projection of the flange 60, and four holes 68 are provided with lips during the fabrication of the insert 56 to receive guide and placement pins within the mold cavity during molding of the projector portion.

Figure 4:
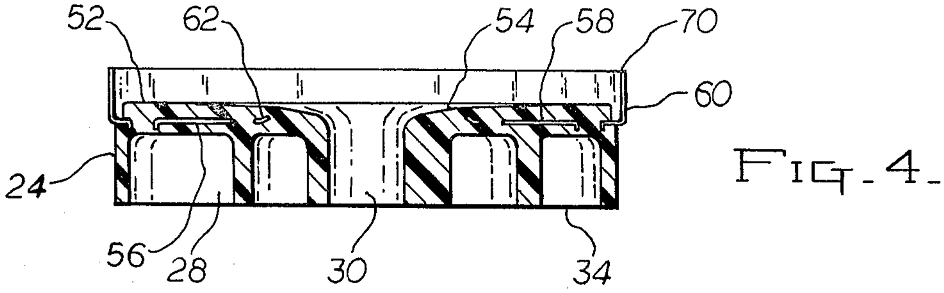
FIG. 4 is an elevational, diametrical, sectional view of the projector portion in which the insert is molded, illustrating the insert prior to being deformed upon the motor housing.

The insert 56 is located within the mold cavity of an injection molding machine by pins received within the lipped openings 68, and is so located within the mold cavity that introduction of the synthetic plastic material of the portion 24 will surround the insert central region on both sides thereof, and fill the holes 64. Upon ejection of the projector portion 24 from the mold cavity the projector portion and metal insert are assembled into an integral assembly as represented in FIGS. 4 and 5. The insert central region 58 is located "below" the projector surface 54, and the insert opening 62 is large enough not to intersect the air passage inlet 30. However, the insert flange 60 extends from the configuration of the projector portion 24 and extends beyond the projector mounting surface 52 in a perpendicular relationship thereto.

Assembly of the motor housing 14, diaphragm 36, and projector part 24 occurs by aligning the axes of the housing mounting surface 50 with the axis of the projector mounting surface 52, and locating the diaphragm periphery 38 intermediate these mounting surfaces with the annular gaskets 40 and 42 located upon opposite sides of the diaphragm periphery. The inner diameter of the insert flange 60 is slightly greater than the diameter of the motor housing flange 44, and the insert flange telescopes around the flange periphery 46, extending above flange surface 48. Thus, it will be appreciated that the axial dimension of the insert flange 60 is such as to result in a free end 70 of the insert flange which extends beyond the housing flange 44.

Thereupon, the insert flange end 70 is deformed inwardly upon the flange surface 48, FIG. 3, preferably by a rolling operation whereby the entire annular insert flange end 70 will be firmly deformed upon the flange 44 to maintain the assembly of the motor housing 14, projector portion 24, diaphragm 36 and the gaskets 40 and 42. This assembly will position the armature 16 within the motor coil, and the diaphragm is securely supported with respect to the housing and projector.

The outer projector portion 26 is bonded to the projector portion 24 at the parting line 34 to complete the horn assembly, and in some instances, it may be preferable to assemble the projector portions 24 and 26 prior to the assembly of the projector to the motor housing.

As the metal insert 56 is firmly embedded into the material of the inner projector portion 24 a high strength mechanical interconnection between the insert and projector is achieved. Also, as the insert flange end 70 is firmly rolled upon the motor housing flange 44 throughout the configuration of the motor housing a uniform assembly force between the motor housing and projector is achieved which insures that the support of the diaphragm at its periphery will be uniform, resulting in the reduction of stresses in the diaphragm, and assuring the designed frequency of oscillation of the diaphragm and the audio characteristics produced thereby. The insert flange 60 is concisely related to the configuration of the motor housing, and the described assembly does not result in any projections or protuberances, and results in a "clean" appearance.

It is appreciated that various modifications to the inventive concept may be apparent to those skilled in the art without departing from the spirit and scope of the invention.

I claim:

1. As an article of manufacture, a molded synthetic plastic electric horn projector having an annular planar surface defined thereon for mounting the projector upon a motor subassembly having a flange portion, a metal insert integrally molded into the material of said projector, and a deformable metal flange of annular configuration defined upon said insert surrounding said mounting surface and projecting from said projector configuration adjacent said mounting surface intersecting the plane of said mounting surface and extending therebeyond for deformation upon the subassembly flange portion.

2. In an electric horn including a motor housing having a flange defining a periphery and a flat projector mounting surface, a projector mounted upon the flange mounting surface having a sound passage for emitting sound, said projector being of a molded construction formed of a synthetic plastic material having a mounting surface in opposed relationship to the motor housing flange projector mounting surface, the improvement comprising, a metal insert integrally molded into the plastic projector material having a deformable portion projecting from the configuration of the projector adjacent the mounting surface of the projector, said deformable portion being deformed upon the motor housing flange over the periphery thereof to maintain the motor housing and projector in assembled relation.

3. In an electric horn as in claim 2, said deformable portion comprising a flange defined upon said insert of a continuous configuration extending beyond the mounting surface defined upon the projector, said insert flange extending about the motor housing flange periphery and being deformed upon the motor housing flange.

4. In an electric horn as in claim 3, said metal insert comprising a disc having a substantially flat central region, said insert flange being defined at the periphery of said insert and comprising a cylinder having an axis substantially perpendicular to said insert central region.

5. In an electric horn as in claim 4, a plurality of holes defined in said insert central region to aid in the bonding of said insert with the material of said projector.

6. In an electric horn as in claim 3, wherein the motor housing projector mounting surface and the projector mounting surface are each substantially flat and circular in configuration, said metal insert flange being of a cylindrical configuration extending about the mounting surface of the projector and transversely extending therebeyond, said cylindrical insert flange including an outer end region deformed over the periphery of the motor housing flange.

* * * * *